May 6, 1952 F. R. McFARLAND 2,595,969
TRANSMISSION
Filed March 16, 1946 2 SHEETS—SHEET 1
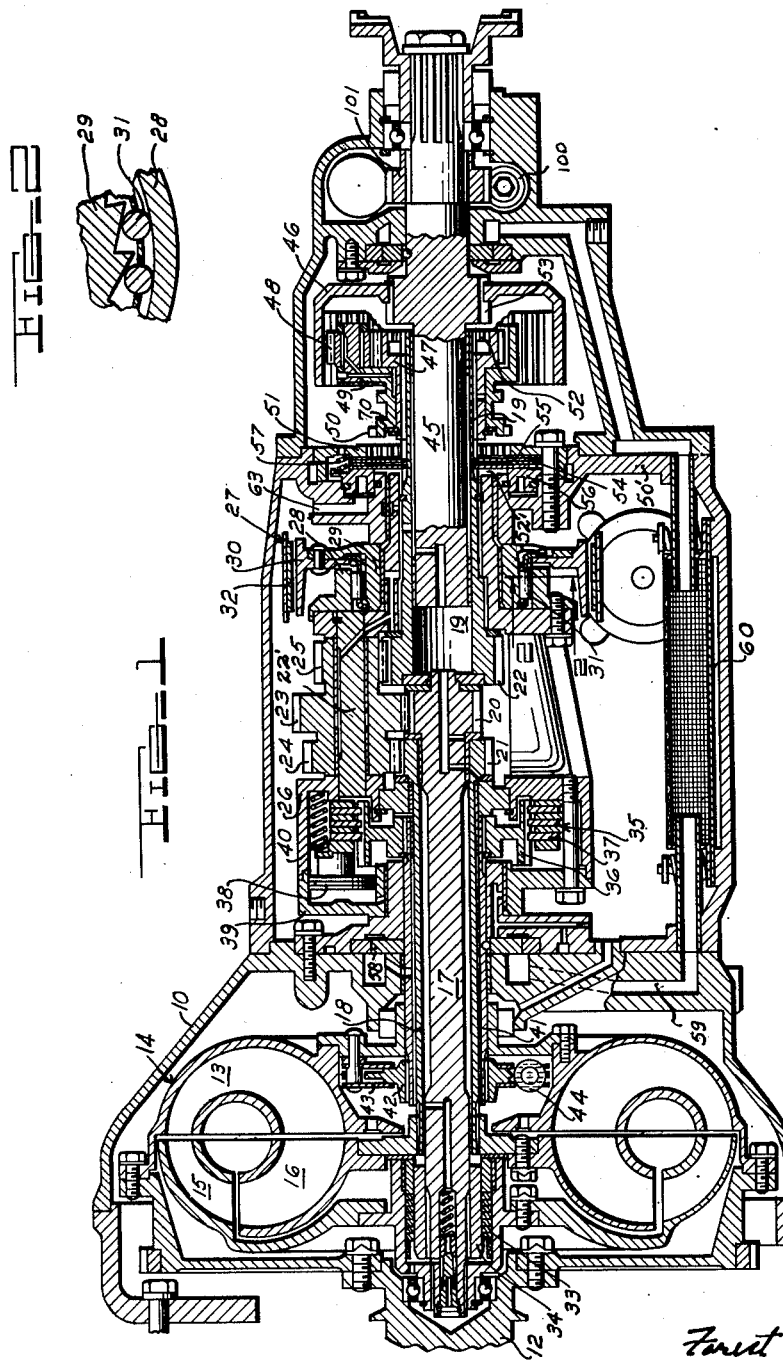

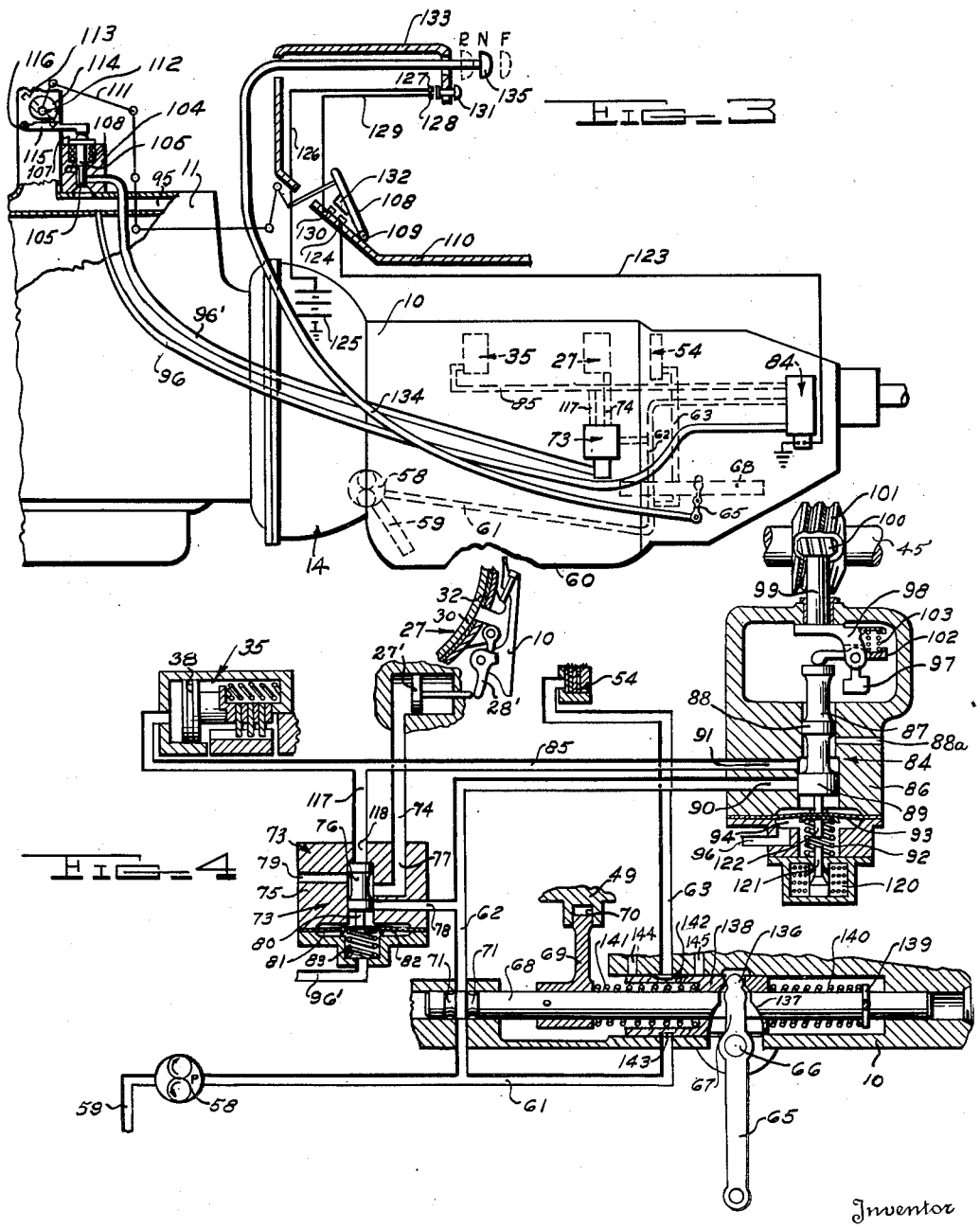

Patented May 6, 1952

2,595,969

UNITED STATES PATENT OFFICE 2,595,969

TRANSMISSION

Forest R. McFarland, Huntington Woods, Mich., assignor to Packard Motor Car Company, Detroit, Mich., a corporation of Michigan Application March 16, 1946, Serial No. 654,907

8 Claims. (Cl. 74—472)

This invention relates to motor vehicle transmissions and to control means therefor.

In one type of transmission planetary gearing is controlled by braking a reaction member to establish geared drive and by clutching two members to establish direct drive. Mechanism is usually provided to be conditioned by the driver for selecting forward or reverse drive and neutral. The braking and clutching selections are usually automatically controlled after the driver has first conditioned the transmission for operation by forward or reverse selection and manipulation of the accelerator pedal beyond idling position. Provision is also usually made for overruling the automatic selection of the speed ratio in the gearing by movement of the accelerator pedal beyond wide open throttle position. Thus the accelerator pedal and the shift selector are operated by the driver and the balance of the control of the transmission is automatic except for the shift at the will of the driver from high speed drive to geared drive.

An object of this invention is to provide a transmission control mechanism of the character referred to in which a shift lever and an accelerator pedal are actuated in series to condition the gearing for driving.

Another object of the invention is to provide a transmission of the character referred to in which direct drive is automatically effected by a vacuum and speed responsive valve device in a fluid control system to shift up in the speed selection and such drive is maintained effective by fluid pressure in the control system below the value at which the upshift was made.

Another object of the invention is to provide a transmission of the character referred to with control valves for establishing two different driving speeds that are responsive to pressure conditions in the engine intake manifold.

Still another object of the invention is to provide a transmission of the character referred to in which braking and clutching are controlled by a fluid system in which valves are automatically operated and in which fluid pressure, when energizing the clutching device, assists in maintaining the braking valve in open relation whereby the reaction member in the gearing will always be ready to establish geared drive whenever high speed drive becomes ineffective.

Other objects of the invention will appear from the following description taken in connection with the drawing, which forms a part of this specification, and in which:

Fig. 1 is a sectional view of a transmission and control means therefore incorporating the invention;

Fig. 2 is a fragmentary sectional view of the one-way brake for the gearing taken on line 2—2 of Fig. 1;

Fig. 3 is an elevational view of a portion of a motor vehicle showing the general arrangement of the controls for the transmission; and Fig. 4 is a diagrammatic and partly sectional view of the control system for the transmission.

The transmission is housed in casing 10 secured to one end of internal combustion engine 11. The engine crankshaft 12 is connected with impeller 13 of a fluid coupling device 14 in which power is transmitted to two runners comprising rotors 15 and 16 and concentric power or drive shafts 17 and 18. A driven shaft 19 aligns with the drive shafts and means is provided for driving the driven shafts from the drive shafts at two reduced speeds through two gear trains. This driving means is in the form of planetary gearing in which gears 20 and 21 are fixed respectively to shafts 17 and 18, and gear 22 is fixed to driven shaft 19. Planet gears 23, 24 and 25 mesh respectively with gears 20, 21 and 22 and are rotatably mounted on a pin 22' fixed to a carrier 26. The planet gears are shown formed as a unitary structure but they may be formed separately and fixed together as a unitary structure.

Drive through either one of the planetary gear trains at a speed less than that of their drive shafts is obtained by engagement of a brake device 27 for holding the carrier to prevent reverse rotation thereof. The carrier has an extension 28 surrounding hub 29 of a sectional reaction member 30 and a one-way roller brake 31 is arranged between extension 28 and hub 29. Brake band 32 is anchored to casing 10 in relation to be engaged with or released from the reaction member 30 by an actuator piston 27' and linkage 28'. Engagement of the brake device will prevent retrograde rotation of the carrier whereupon drive is transmitted through the driving means from either one of the drive shafts to the driven shaft at a reduced speed. One-way clutch 33 provides a driving connection between rotor 15 and sleeve 34 splined to shaft 17. This clutch permits shaft 17 to overrun rotor 15 when rotor 16 is effective as the driver. At low engine speeds the primary rotor 15 will be the driver and at some accelerated speed of the engine the secondary rotor 16 will take over the drive.

A clutch device 35 is operative to connect impeller 13 directly with the carrier whereby the driven shaft 19 is rotated at substantially the same speed as the crankshaft 12. A clutch hub 36 is splined to shaft 41 and the clutch plates 37 are slidably splined to clutch hub 36 and to the carrier 26. The clutch actutor plungers 38 are arranged in an extension 39 of the carrier and are operable by a fluid pressure to engage the clutch plates. Springs 40 in the carrier normally exert pressure to move the actuators away from plate engaging relation. The driving connection between the clutch hub 36 and impeller 13 includes the shaft 41 splined to the clutch hub and to hub 42. The impeller has plate members 43 fixed thereto and coil springs 44 provide a driving connection between the plates 43 and the hub 42.

When the clutch is engaged, the carrier is driven directly by the impeller 13 so that power will flow from the carrier through the planet gears to the driven shaft 19. At the same time rotor 15 will be driving shaft 17 so that the high speed gear train will be effective to also drive the driven shaft 19 through the planetary gearing. This two-path drive will cause rotation of the driven shaft at substantially the same speed as that of the crankshaft.

Tail shaft 45 extends into the driven shaft 19 and is splined to receive an annulus gear 46 that surrounds sun gear 47 splined on the driven shaft 19. Planet gears 48 mesh with the sun gear and the annulus gear and are rotatably mounted on a shiftable carrier 49. The carrier is provided with clutch teeth 50 adapted to engage with teeth on brake plate 51 fixed in chamber 52' in casing wall 50'. Carrier 49 is rotatably mounted on sun gear 47 but is secured therewith against relative axial movement. The sun gear has internal clutch teeth 52 adapted to mesh with the splines 53 on the tail shaft. By shifting the carrier axially to the left, as viewed in Fig. 1, teeth 50 may be moved into engagement with the teeth on plate 51 to cause a reverse drive from shaft 19 to shaft 45. When the sun gear and carrier are shifted to the right, teeth 52 will engage with the splines 53 on the tail shaft to provide a direct drive from shaft 19 to shaft 45. In intermediate or neutral position of the sun gear and carrier, teeth 50 will be disengaged from member 51 and teeth 52 will be disengaged from splines 53.

A synchronizer brake 54 is arranged to hold shaft 19 stationary with plate 51 in order that teeth 50 may be shifted into engagement with the teeth on plate 51 without clash. This synchronizer brake consists of plates 55 arranged in a chamber 52' in which actuator pressure ring 56 is located. This actuator is normally moved to brake disengaging position by spring 57. The geared drive brake device 27, the clutch device 35 and the synchronizer brake device 54 are applied by a pressure fluid system. In such system there is a pump 58 driven from the impeller shaft 41 and having an inlet conduit 59 open to the bottom of casing 10 and having an outlet conduit 61 terminating in a pair of branches 62 and 63. The branch conduit 63 leads to the synchronizer brake actuator 56 and the branch conduit 62 supplies fluid to the geared drive brake device 27 and the clutch device 35.

The fluid flow through the branch conduits 62 and 63 is under control of the shift mechanism for establishing forward or reverse drive. Shift lever 65 is pivoted to casing 10 at 66 and has an arm 67 for moving shaft 68 in an axlal direction. This shaft carries a yoke 69 arranged to fit into a recess 70 in carrier 49. This shaft also provides a valve for controlling the flow through branch conduit 62. One end of shaft 68 traverses the branch conduit 62 and is formed with a pair of spaced recesses 71 adapted to register with the branch conduit to permit fluid flow therethrough when the shifter yoke is in reverse or forward drive positions. When the shifter yoke is in neutral position flow through branch conduit 62 will be blocked off. Thus the drive selecting mechanism serves to allow fluid flow from the pump to the brake and clutch devices 27 and 35 when in forward or reverse positions.

The branch conduit 62 is connected with a valve device 73 and conduit 74 leads from the valve device to the brake device 27. The valve device comprises the casing 75 in which valve 76 is shiftable to control the flow between the outlet passage 77 and the inlet passage 78. There is a vent passage 79. The valve is connected by stem 80 with a diaphragm 81 extending across the chamber 82 and spring 83 is arranged in this chamber to exert pressure against the diaphragm to normally move the valve 76 to closed position shutting off flow between passages 78 and 77.

Branch conduit 62 also leads to valve device 84 and conduit 85 connects the valve device with the clutch device 35. This valve device 84 comprises a casing 86 in which a valve 87 is axially movable. The valve has flanges 88 and 89 of different diameter and a connecting stem portion of less diameter than the smaller flange. The conduit 62 communicates with inlet passage 90 and conduit 85 communicates with outlet passage 91, these passages being parallel and opening into the portion of the casing in which the large diameter flange 89 of the valve 87 is slidable. The larger diameter flange of the valve controls flow between passages 90 and 91 and is normally moved to close passage 90 by spring 92 bearing against diaphragm 93 secured to valve 87. The diaphragm defines a chamber 94 in which the spring 92 is housed. The valve is moved in an opening direction by two forces, one of which is responsive to vehicle speed and the other of which is responsive to pressure in the intake manifold 95 of the engine 11. A conduit 96 leads from the intake manifold to chamber 94. A speed responsive bell crank or governor 97 is pivoted on a bracket 98 fixed to shaft 99 on which is fixed a gear 100 meshing with gear 101 on the tail shaft. The bell crank also has an arm 102, and spring 103 extends between this arm and the bracket 98 to exert a force opposing centrifugal force to which the bell crank is subjected by rotation of the shaft 99. An arm of the bell crank rests against the upper end of valve 87 and as centrifugal force increases the bell crank pivots so that the bell crank arm, opposite arm 102, moves valve 87 downwardly to open passage 90 to passage 91. The pressure of centrifugal force on the valve and manifold pressure acting on the diaphragm combine to shift the valve 87 toward open position but such forces are opposed by spring 92. Spring 92 exerts a predetermined force tending to close the valve and this force must be overcome by the forces acting in the opposite direction against the valve in order to connect conduits 62 and 85 so that fluid may flow to the clutch device 35. The arrangement is such that the valve will open when the vehicle is traveling at a speed around 12 miles per hour.

As previously stated spring 83 acting against diaphragm 81 tends to hold valve 76 closed so that fluid cannot flow from conduit 62 to conduit 74 and under this condition the reaction member 30 is released so that there will be no drive through the planetary gearing provided there is no sub-atmospheric pressure in chamber 82. Conduit 96' connects chamber 82 with bore 105 in the boss 104 which is open to the intake manifold and a valve device is arranged in the boss bore. Valve 106 (Fig. 3) is axially movable in the boss bore and there is a flange 107 on the valve engaged by spring 108 normally urging the valve to closed position. Arrangement is made to open the valve in conjunction with operation of the accelerator pedal 108 of the motor vehicle pivoted at 109 to the floor board 110. Linkage 111 extends from the accelerator pedal to a shaft 112 on which throttle valve 113 is fixed and rotation of this shaft is effective to cam the valve 106 open when the throttle valve is opened beyond engine idling position. Cam 114 is fixed on shaft 112 and is arranged to engage a valve operating lever 115 pivoted to the engine at 116. When the accelerator pedal is in idling position the throttle valve 113 is substantially closed and when in such position the cam 114 is ineffective to open the valve normally closed by spring 108. As soon as the accelerator pedal is depressed beyond idling position the cam 114 presses lever 115 down thereby opening valve 106 so that sub-atmospheric pressure in the intake manifold will influence the diaphragm associated with valve 76. Thus it will be seen that valve 76 controlling fluid flow to the brake will be closed when the accelerator pedal is in idling position and will be opened by the sub-atmospheric pressure in the manifold communicating with chamber 82 and acting upon the diaphragm 81 as soon as the accelerator pedal is depressed for accelerating the engine. Thus the shift lever valve and the accelerator pedal controlled valve are in series and both must be open before fluid can flow to the brake device 27 to establish drive through the planetary gearing. With the brake device 27 applied, the carrier 26 will be held stationary and low speed drive through gears 20, 23, 25 and 22 will occur when rotor 15 is effective and a higher speed gear drive will occur when rotor 16 is effected through gear train 21, 24, 25 and 22. When the vehicle speed influence and sub-atmospheric pressure combine to overcome spring 92 so that valve 89 will open passage 90 to passage 91, which is approximately at the vehicle speed of 12 miles per hour, fluid will flow to the clutch device 35 to establish direct drive through the planetary gearing as previously described. When valve 87 has opened, the pressure of fluid against the larger diameter flange 89 serves as an additional force with the centrifugal force and sub-atmospheric force acting to hold the valve 87 in open position. This additional force of fluid pressure will maintain the valve open below the governed speed of 12 miles per hour and thus will delay closing of the valve until a speed below the governed speed is reached. This fluid pressure effect on the valve 87 will prevent "hunting," that is, opening and closing movement when the speed of the vehicle is approximately 12 miles per hour and it also delays shift back from direct drive to geared drive at a speed below the governed upshift speed.

When valve 87 is moved axially due to the combined effect of speed and vacuum, the flange 88 closes a vent 88-a, and the flange 89 opens the passage 90, thereby permitting fluid under pressure to flow into the passage 91 through conduit 85 to actuate the plunger 38 of the direct drive clutch device 35 and thus establish direct drive. The carrier 26 will overrun the reaction member 30 due to the overrunning brake connection 31 and thus the reaction member is always held ready to again establish geared drive immediately upon closing of valve 87. Valve 76 remains open so long as the accelerator pedal is depressed beyond idling position, due to the sub-atmospheric pressure in chamber 82, and it is also maintained in open position when the valve 87 is open through means of fluid pressure in the conduit leading to the clutch device 35. A conduit 117 leads from conduit 85 to passage 118 in casing 75 so that fluid pressure in conduit 85 will act to press valve 76 toward open position. This added pressure acting to open valve 76 when the fluid pressure line 85 to clutch 35 is open will insure that the brake device 27 is applied so that geared drive will automatically become effective whenever the clutch control valve 87 is closed to vent the clutch device 35 through the vent passage 88-a thereby disengaging it.

Provision is made for overruling the clutch control valve device so that geared drive may be established at the will of the driver. Means under the control of the driver is provided to move the valve 87 upwardly to closing position even though the intake manifold force and the centrifugal force dictate that the valve should be open. One means of obtaining this overruling of the clutch valve control device consists of electrically energized means under the control of the accelerator pedal. Such means includes a solenoid 120 having an armature member 121 associated therewith and in the form of a pin adapted to be moved against an extension 122 of valve 87. The solenoid has a line 123 connected therewith and this line leads to contact 124 on the floor board. Battery 125 is connected by line 126 with contact 127 and contact 128 is connected by line 129 to contact 130. Contacts 127 and 128 are arranged to be closed by a dash switch 131 and contacts 130 and 124 are arranged to be closed by switch 132 fixed on the accelerator pedal and effective only while the accelerator pedal is in overtravel position, that is, beyond wide open throttle position. Thus, by pressing the accelerator pedal down beyond wide open throttle position the circuit to the solenoid is established whereupon the pin 121 will be moved upwardly to shift valve 81 to closed position. Switch 131 may be the ignition switch for the motor vehicle engine located on the instrument panel 133 of the vehicle. As long as the pedal is maintained in overtravel position the planetary gearing will remain in geared drive and as soon as the pedal is released from overtravel position and the vehicle is above the governed speed then valve 87 will return to its open position whereupon the clutch device 35 will again become effective.

Shift lever 65 is operated by Bowden wire 134 extending through the instrument board and having a knob 135 on its end by means of which the driver can shift to select forward or reverse drive and neutral, such positions being indicated by letters F, N and R in Fig. 3. The shift lever 65 has a ball shaped end 136 extending through a slot 137 in shift rod 68 and engaging in a recess in sleeve valve 138. Collar 139 and shifter yoke 69 are fixed on rod 68. Springs 140 and 141 surround the shaft 68 and exert an equal opposed pressure whereby sleeve 138 and the shift rod are normally urged to neutral position as shown in Fig. 4. Spring 140 bears at one end against collar 139 and at the other against sleeve 138 while spring 141 bears at one end against yoke 69 and at the other end against the sleeve valve 138. The sleeve valve has a semicircular outlet groove 142 with which a smaller inlet groove 143 communicates. When groove 143 registers with conduit 61 the sleeve 138 is in neutral position so that fluid will flow through groove 145 to branch conduit 63 and chamber 52' to apply the synchronizer brake 54 and thereby hold shaft 19 stationary. Movement of lever 65 will cause the end 136 to shift the sleeve 138 axially to move groove 143 out of registration with conduit 61 and will cause groove 142 to register with either vent port 144 or 145 in casing 10 depending upon the direction of shift. At the same time either spring 140 or 141 will be compressed to shift rail 68 to engage the forward or reverse clutch teeth just prior to venting the brake chamber 52'. In the event the clutch teeth abut, the compressed spring will force the clutch teeth into engagement upon release of shaft 19. Thus the clutch teeth will be engaged without clash. This synchronizing or braking of the driven shaft during forward and reverse selection is covered in my co-pending application Serial No. 644,319, filed January 30, 1946, now Patent #2,559,128, July 3, 1951.

It will be understood that various forms of the invention other than those described above may be used without departing from the spirit or scope of the invention.

What is claimed is:

1. In a transmission for motor vehicles driven by an engine having a fuel intake manifold and controlled by an accelerator pedal, a power shaft driven by the engine, a driven shaft, planetary gearing connecting said shafts and having reaction means, reverse gearing driven from the planetary gearing, a drive selection shift lever for the transmission, a primary valve in the system operative by the shift lever, said valve being closed in neutral position and open in forward and reverse positions of the shift lever, a brake device for the reaction means, a pressure fluid system connected to apply the brake device, a valve device controlling fluid flow to the brake device, conduit means leading from the engine manifold to the valve device whereby manifold pressure is transmitted to the valve device to effect the opening thereof, a normally closed valve in the conduit means, and means operating in conjunction with the accelerator pedal for opening the conduit valve when the pedal is depressed beyond engine idling position.

2. In a transmission for motor vehicles driven by an engine having a fuel intake manifold, a power shaft driven by the engine, a driven shaft, planetary gearing adapted to drivingly connect said shafts and having a carrier, a reaction member, an overrunning brake between the carrier and the reaction member, a clutch for effecting unitary rotation of the gearing, a pressure fluid system leading to the brake and the clutch, means in the system for opening the brake control valve while the engine is running above idling speed, a valve in the system controlling fluid flow to the clutch, a spring normally closing said valve, means responsive to manifold pressure and vehicle speed opposing said spring pressure and tending to open the valve, and electrically energized means operable at will for overruling the means responsive to manifold pressure and vehicle speed to close the valve.

3. In a transmission for motor vehicles driven by an engine having a fuel intake manifold, a power shaft driven by the engine, a driven shaft, planetary gearing adapted to drivingly connect said shafts and having a carrier, a reaction member, an overrunning brake between the carrier and the reaction member, a clutch for effecting unitary rotation of the gearing, a pressure fluid system leading to the brake and the clutch, means in the system for opening the brake control valve while the engine is running above idling speed, a valve in the system controlling fluid flow to the clutch, a spring normally closing said valve, means responsive to manifold pressure and vehicle speed opposing said spring pressure and tending to open the valve, and a solenoid adapted to be energized at will by the vehicle driver for overruling the means responsive to manifold pressure and vehicle speed to close the valve.

4. In a transmission for motor vehicles driven by an engine having a fuel intake manifold and controlled by an accelerator pedal, said pedal having a normal operating movement and an additional movement overtraveling the normal movement, a power shaft driven by the engine, a driven shaft, planetary gearing adapted to drivingly connect said shafts and having a carrier, a reaction member, an overrunning brake between the carrier and the reaction member, a clutch for effecting unitary rotation of the gearing, a pressure fluid system leading to the brake and the clutch, a brake control valve in the system, means in the system for opening the brake control valve while the engine is running above idling speed, a valve in the system controlling fluid flow to the clutch, a spring normally closing said valve, means responsive to manifold pressure and vehicle speed adapted to open the valve, electrically energized means for overruling the means responsive to manifold pressure and vehicle speed to close the valve, and switch means for the electrically energized means adapted to be closed by the accelerator pedal while in overtravel position.

5. In a transmission for motor vehicles driven by an engine, a power shaft driven by the engine, a driven shaft, planetary gearing adapted to drivingly connect said shafts and having a carrier, a reaction member, an overrunning brake between the carrier and the reaction member, a control brake for holding the reaction member stationary to effect geared drive through the planetary gearing, a clutch engageable to effect unitary rotation of the planetary gearing, a pressure fluid system for applying the brake and clutch, a normally closed valve in the system controlling fluid flow to the brake, a speed influenced valve in the system controlling fluid flow to the clutch, and means connecting the portion of the system between the clutch control valve and the clutch to the brake control valve whereby fluid pressure will hold the brake control valve open while the clutch control valve is open.

6. In a transmission for motor vehicles driven by an engine, a power shaft driven by the engine, said engine having a fuel intake manifold and an accelerator pedal, a driven shaft, planetary gearing adapted to connect said shafts in geared drive and having a carrier, a reaction member, an overrunning brake between the carrier and the reaction member, a control brake for holding the reaction member stationary to effect geared drive through the planetary gearing, a clutch engageable to effect unitary rotation of the planetary gearing, a pressure fluid system for applying the brake and clutch, a normally closed valve in the system controlling fluid flow to the brake, a conduit leading from the manifold to the brake control valve whereby manifold pressure may act to open the brake valve, a normally closed valve in the conduit opened by the accelerator pedal beyond idling position, a speed influenced valve in the system controlling fluid flow to the clutch, and means connecting the portion of the system between the clutch control valve and the clutch to the brake control valve whereby fluid pressure will hold the brake control valve open while the clutch control valve is open.

7. In a transmission for motor vehicles driven by an engine, a power shaft driven by the engine, said engine having an intake manifold, a driven shaft, planetary gearing adapted to drivingly connect said shafts to rotate at different speeds and having a carrier, a reaction member, an overrunning brake between the carrier and the reaction member, a control brake for holding the reaction member stationary to effect geared drive through the planetary gearing, a clutch engageable to effect unitary rotation of the planetary gearing, a pressure fluid system for applying the brake and clutch, a normally closed valve in the system controlling fluid flow to the brake, a valve in the system controlling fluid flow to the clutch, said valve being opened in response to vehicle speed and pressure in the manifold, and means connecting the portion of the system between the clutch control valve and the clutch to brake control valve whereby fluid pressure will hold the brake control valve open while the clutch control valve is open.

8. In a transmission for motor vehicles driven by an engine, a power shaft driven by the engine, said engine having a fuel intake manifold and an accelerator pedal, a driven shaft, planetary gearing interposed between said shafts and having a carrier, said gearing being controlled for reduced or direct drive, a reaction member, an overrunning brake between the carrier and the reaction member, a control brake for holding the reaction member stationary to effect reduced drive through the planetary gearing, a clutch engageable to effect unitary rotation of the planetary gearing, a pressure fluid system for applying the brake and clutch, a normally closed valve in the system controlling fluid flow to the brake, means for moving the valve to open position in response to manifold pressure, a conduit connecting the manifold and valve, a valve in the conduit controlled by the accelerator pedal whereby manifold pressure may open the brake control valve, a normally closed valve in the system controlling fluid flow to the clutch, speed and manifold pressure means for opening the clutch valve, and means connecting the portion of the system between the clutch control valve and the clutch to the brake control valve whereby fluid pressure will hold the brake control valve open while the clutch control valve is open.

FOREST R. McFARLAND.

REFERENCES CITED

The following references are of record in the file of this patent:

UNITED STATES PATENTS

| Number | Name | Date |
|---|---|---|
| 1,669,438 | Aikman | May 15, 1928 |
| 2,068,142 | Keller | Jan. 19, 1937 |
| 2,079,654 | Linsley | May 11, 1937 |
| 2,094,449 | Forichon | Sept. 28, 1937 |
| 2,100,748 | Prince | Nov. 20, 1937 |
| 2,173,659 | Patterson | Sept. 19, 1939 |
| 2,177,428 | Fleischel | Oct. 24, 1939 |
| 2,193,542 | Tyler | Mar. 12, 1940 |
| 2,203,296 | Fleischel | June 4, 1940 |
| 2,229,345 | Schotz | Jan. 21, 1941 |
| 2,278,351 | Havens | Mar. 31, 1942 |
| 2,332,593 | Nutt et al. | Oct. 26, 1943 |
| 2,343,955 | Cotterman | Mar. 19, 1944 |
| 2,376,545 | Livermore | May 22, 1945 |
| 2,404,623 | Dodge | July 23, 1946 |
| 2,407,289 | LaBrie | Sept. 10, 1946 |